(12) United States Patent
Orikasa

(10) Patent No.: US 7,059,735 B2
(45) Date of Patent: Jun. 13, 2006

(54) ILLUMINATING MECHANISM OF ROTARY ELECTRIC COMPONENT

(75) Inventor: Takamichi Orikasa, Iwate-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 137 days.

(21) Appl. No.: 10/758,707

(22) Filed: Jan. 16, 2004

(65) Prior Publication Data
US 2004/0145884 A1 Jul. 29, 2004

(30) Foreign Application Priority Data
Jan. 21, 2003 (JP) .............................. 2003-012387

(51) Int. Cl.
*G01D 11/28* (2006.01)
(52) U.S. Cl. .................... 362/23; 362/30; 200/316; 200/317
(58) Field of Classification Search .............. 362/23, 362/26, 30; 200/310, 311, 313, 316, 317
See application file for complete search history.

(56) References Cited

U.S. PATENT DOCUMENTS 2,831,453 A * 4/1958 Hardesty .................. 116/288
4,800,466 A * 1/1989 Bauer et al. ................ 362/26
4,807,091 A * 2/1989 Obata ......................... 362/30
5,861,589 A * 1/1999 Sato et al. ................. 200/5 R
6,394,619 B1 * 5/2002 Snider ......................... 362/30

FOREIGN PATENT DOCUMENTS

JP 07-335076 12/1995

* cited by examiner

*Primary Examiner*—John Anthony Ward
(74) *Attorney, Agent, or Firm*—Brinks Hofer Gilson & Lione

(57) ABSTRACT

In a rotary electric component, an annular thin faceplate disposed around a rotary knob is provided with an illuminated display portion inner and outer circumferential portions of the rear surface of the faceplate are bonded and fixed to a holder, and the rotary knob and the display portion is assembled in cutout of a front panel. A large-diameter annular portion of the holder adhering to the outer circumferential portion of the faceplate protrudes forward farther than a small-diameter annular portion adhering to the inner circumferential portion. A protruding portion of the front panel extending around the circumferential edge of the cutout presses a region near the outer circumferential portion of the faceplate. As a result, the inner circumferential portion of the faceplate is reliably compressed against the holder a small-diameter annular portion).

12 Claims, 3 Drawing Sheets

ILLUMINATING MECHANISM OF ROTARY ELECTRIC COMPONENT

This application claims the benefit of priority to Japanese Patent Application No. 2003-012387, filed Jan. 21, 2003, herein incorporated by reference.

BACKGROUND OF THE INVENTION

1. Field of the Invention

The present invention relates to an illuminating mechanism of a rotary electric component capable of illuminating a display portion of a faceplate disposed around a rotary knob, and specifically to an illuminating mechanism which can be suitably applied to automotive rotary electric components such as an air conditioning system, an audio system, and the like.

2. Description of the Related Art

In rotary electric components used in an automotive air conditioning system, an automotive audio system, and the like, in order for an occupant to see the position of a rotary knob in a dark place, an illuminating mechanism, in which a faceplate having a display portion formed around the rotary knob is disposed and the display portion can be illuminated from the rear surface of the faceplate, is widely employed (for example, see Patent Document 1).

FIG. 6 is a cross-sectional view illustrating an example of a conventional automotive rotary electric component employing this kind of illuminating mechanism. The rotary electric component 1 shown in FIG. 6 comprises a cylindrical rotary knob 2, a rotary encoder of which a rotor portion 6 is rotated by the rotary knob 2, an annular thin faceplate 3 disposed around the rotary knob 2, a holder 4 for bonding and fixing an inner circumferential portion and an outer circumferential portion of the rear surface of the faceplate 3, a light guiding member 5 which is held by the holder 4 and of which an inner ring portion 5a and an outer ring portion 5b are connected to each other, a light source 7 disposed adjacent to the light guiding member 5, and a circuit board 8 on which the rotary encoder, the light source 7, and so on are mounted.

The rotary knob 2 is made of a synthetic resin material having a light shielding property, and a positional mark 2a to be illuminated through the inner ring portion 5a of the light guiding member 5 is attached to a part of the rotary knob 2. The faceplate 3 is formed by applying a light shielding paint to the front surface of a light-transmitting resin plate except for a display portion 3a and attaching a colored toning sheet to the entire rear surface of the resin plate, and the display portion 3a is illuminated with the desired color corresponding to the toning sheet through the outer ring portion 5b of the light guiding member 5. The display portion 3a is an illuminating area in which symbols or letters, etc. as indexes of the position of the rotary knob 2 are displayed, and by seeing which place the positional mark 2a indicates, an occupant can confirm the position of the rotary knob 2. The light guiding member 5 is formed by molding a material having a sufficient light-transmitting property such as acryl resin. The light incident on an end surface 5c of the light guiding member 5 from the light source 7 is emitted from the inner ring portion 5a to the rotary knob 2 and is also emitted from the outer ring portion 5b to the faceplate 3. The holder 4, which is formed by molding resin, is also used as an upper case formed as one body together with a lower case (not shown). Furthermore, respective front end surfaces of a small-diameter annular portion 4a and a large-diameter annular portion 4b of the holder 4 are bonded and fixed to the faceplate 3, and the inner ring portion 5a and the outer ring portion 5b of the light guiding member 5 are arranged to sandwich the small-diameter annular portion 4a. The circuit board 8 is attached to the lower case, and the rotary electric component 1 is electrically connected to an external circuit through a connector (not shown) provided on the circuit board 8 or the lower case.

Furthermore, since the rotary knob 2 is freely rotatable with respect to the holder 4, a gap is required between the small-diameter annular portion 4a of the holder 4 and the rotary knob 2. However, since the gap tends to form an optical path through which the light emitted from the inner ring portion 5a leaks, light leakage may be caused, thereby compromising the design of the illuminating system. Therefore, a flange portion 2b is usually provided to protrude from the rotary knob 2, and the flange portion 2b overlaps the small-diameter annular portion 4a of the holder 4.

The rotary electric component 1 described above is assembled in a circular cutout 11 formed in a front panel 10 of a vehicle cabin with the display portion 3a of the faceplate 3 and the rotary knob 2 exposed, and the rotary knob 2 protrudes from the cutout 11. When an occupant manipulates the rotary knob 2, the occupant can confirm the position of rotary knob 2 by seeing a relative position between the positional mark 2a and the display portion 3a. In addition, since the positional mark 2a and the display portion 3a are illuminated from the rear surface thereof, the occupant can manipulate the rotary knob 2 without difficulty even in darkness such as might be experienced during nighttime driving.

[Patent Document 1]

Japanese Unexamined Patent Application Publication No. 7-335076 (pp. 2 to 4, FIG. 4)

In the conventional automotive rotary electric component 1 as described above, in order to prevent the light from the inner ring portion 5a for illuminating the positional mark 2a from leaking forward, the flange portion 2b protrudes from the rotary knob 2. However, since an inner circumferential portion and an outer circumferential portion of the faceplate 3 are bonded and fixed to the holder 4, the light from the outer ring portion 5b for illuminating the display portion 3a does not leak forward, so that a specific countermeasure against the light leakage thereof is not considered. However, since a vehicle cabin may reach extremely high temperatures and its temperature variation is large, adhesive strength may deteriorate over long periods of time, so that a part of the faceplate 3 may get loose from the holder 4. Of course, as shown in FIG. 6, the looseness of the outer circumferential portion of the faceplate 3 can be prevented by employing a construction in which the faceplate 3 is interposed between the front panel 10 and the holder 4. However, there is no solution of light leakage when the inner circumferential portion gets loose.

That is, if a part of the inner circumferential portion of the faceplate 3 gets loose from the holder 4 resulting in a gap, as indicated by arrow B in FIG. 6, the light from the outer ring portion 5b for illuminating the display portion 3a passes through the gap and leaks around the rotary knob 2, thereby compromising the design of the illuminating system markedly. Furthermore, since the display portion 3a should be exposed from the opening portion 11, a construction in which the inner circumferential portion of the faceplate 3 is interposed between the front panel 10 and the holder 4 cannot be employed.

SUMMARY OF THE INVENTION

The present invention is designed to solve the aforementioned problems, and it is thus an object of the present invention to provide a rotary electric component capable of reliably preventing light leakage due to the looseness of a faceplate for a long time.

In order to accomplish the aforementioned objective, an illuminating mechanism of a rotary electric component according to the present invention comprises: a rotary knob assembled in a cutout of a front panel in an exposed state; a thin faceplate having a display portion disposed around the rotary knob; a holder for bonding and fixing an inner circumferential portion and an outer circumferential portion of the faceplate; and a light source for emitting light from the rear surface of the faceplate to the display portion, wherein a region of the holder bonded to the outer circumferential portion of the faceplate protrudes forward farther than a region of the holder bonded to the inner circumferential portion of the faceplate by a predetermined amount, and an area in the vicinity of the outer circumferential portion is pressed by a protruding portion formed on the rear surface of the front panel.

According to the illuminating mechanism of the rotary electric component as described above, since the outer circumferential portion of the faceplate is supported by the holder at a location farther forward than the inner circumferential portion thereof and an area of the outer circumferential portion of the faceplate not supported by the holder is pressed backward by a protruding portion of the front panel, a bending moment is applied to the outer circumferential portion of the faceplate, so that the inner circumferential portion gets compressed to the holder. For this reason, even if the adhesive strength deteriorates, the inner circumferential portion of the faceplate does not get loose. Thus, it is possible to reliably prevent light leakage due to the looseness of the faceplate over a long period of time.

Furthermore, since the display portion is not usually provided in the vicinity of the outer circumferential portion, the display portion is not hidden even if a portion of the outer circumferential portion of the faceplate is covered with the protruding portion of the front panel. Moreover, when the protruding portion of the front panel is continuously formed around the circumferential edge of the cutout, it is easy to ensure the exposed area of the cutout, and it is facilitated to compress the inner circumferential portion of the faceplate to the holder around the entire circumferential edge.

BRIEF DESCRIPTION OF THE DRAWINGS

The above and other features and advantages of the present invention will become more apparent by describing in detail exemplary embodiments thereof with reference to the accompanying drawings in which.

DESCRIPTION OF THE PREFERRED EMBODIMENT

Figure 1:
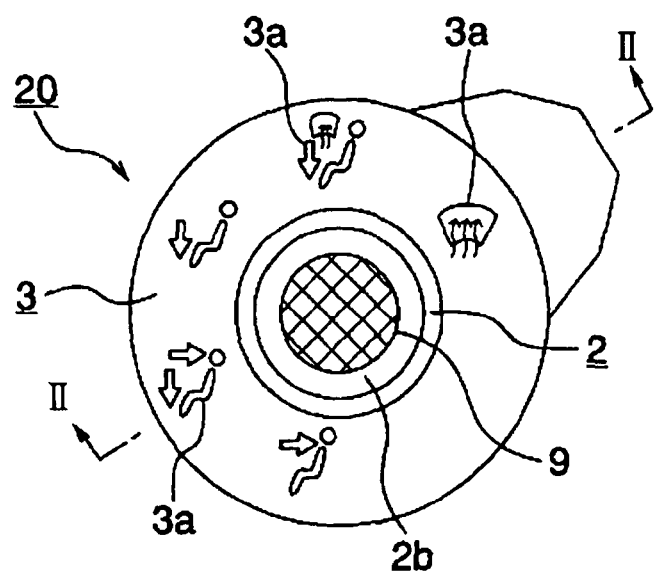
FIG. 1 is a front view of an automotive rotary electric component according to an embodiment of the present invention.
Figure 2:
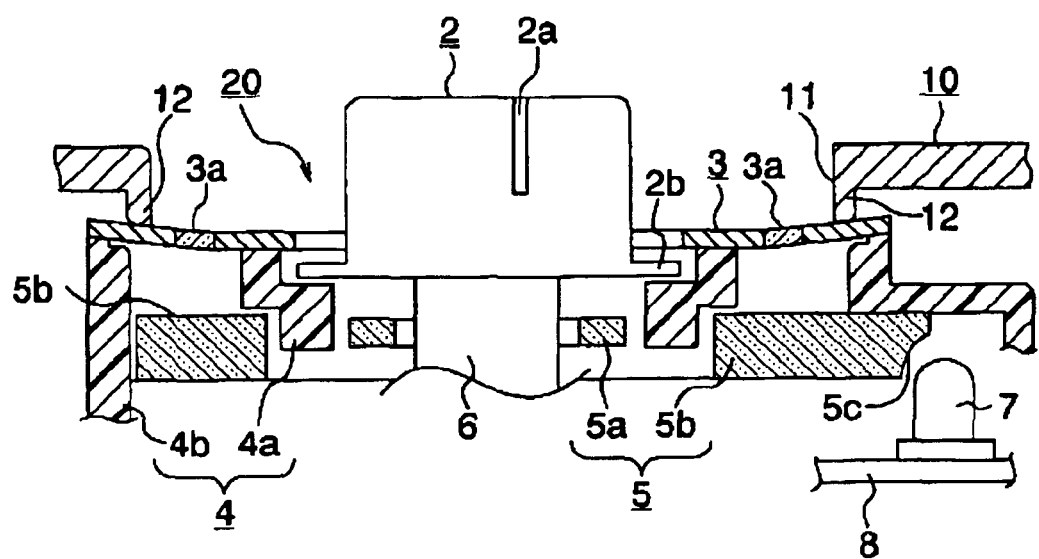
FIG. 2 is a cross-sectional view taken along the line II—II of FIG. 1.
Figure 3:
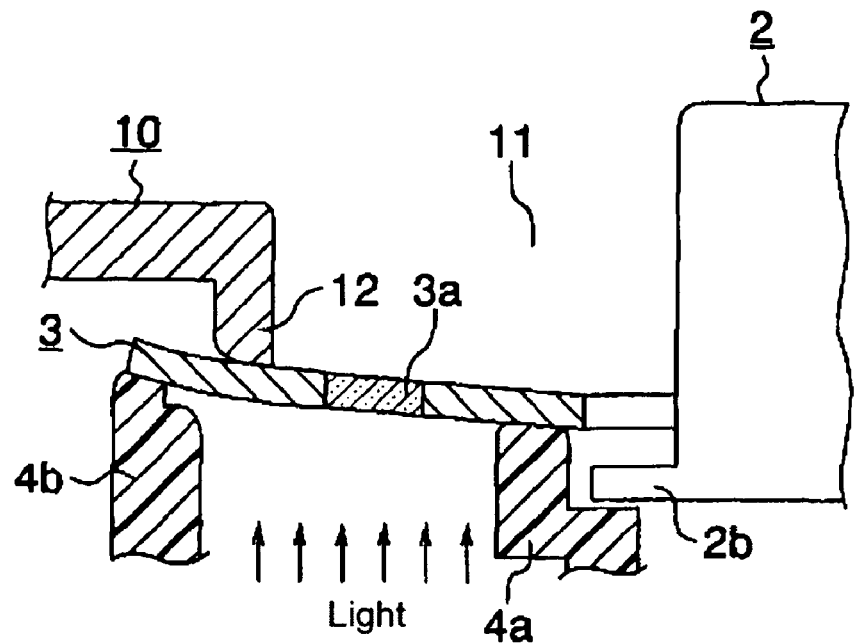
FIG. 3 is an explanatory diagram illustrating an important part of an illuminating mechanism included in the rotary electric component.
Figure 4:
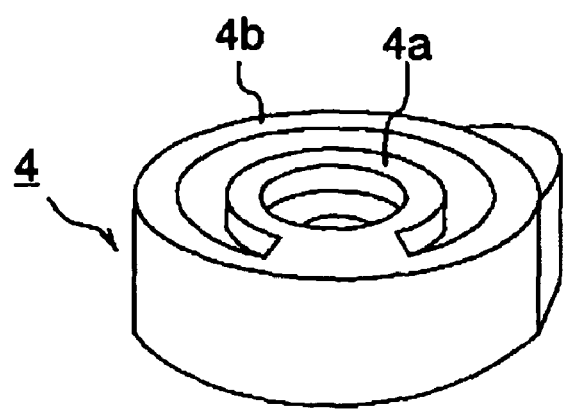
FIG. 4 is a perspective view of a holder included in the rotary electric component.
Figure 5:
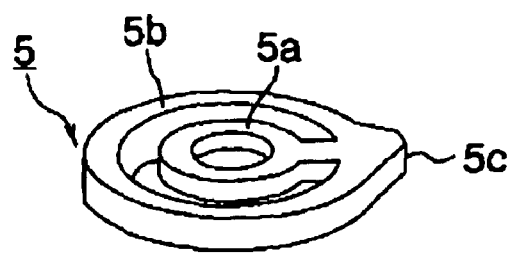
FIG. 5 is a perspective view of a light guiding member included in the rotary electric component.
Figure 6:
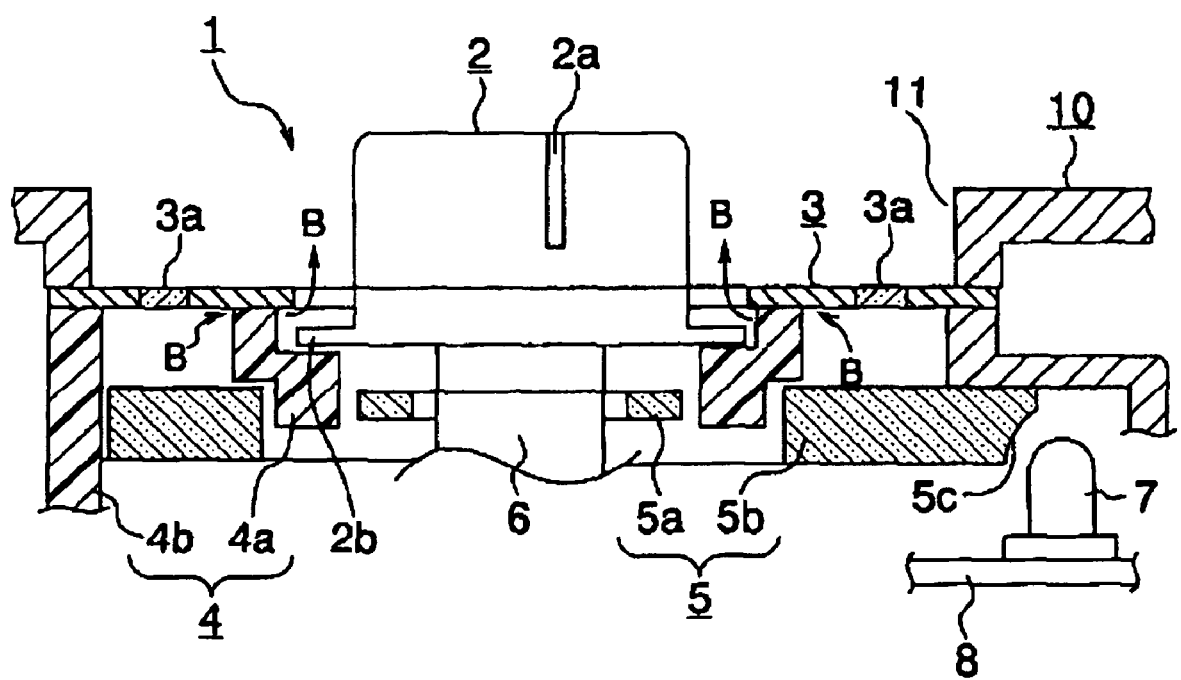
FIG. 6 is a cross-sectional view of a conventional automotive rotary electric component.

A preferred embodiment of the present invention will be described with reference to the drawings. FIG. 1 is a front view of an automotive rotary electric component according to an embodiment of the present invention, FIG. 2 is a cross-sectional view taken along the line II—II of FIG. 1, FIG. 3 is an explanatory diagram illustrating an important part of an illuminating mechanism, FIG. 4 is a perspective view of a holder, and FIG. 5 is a perspective view of a light guiding member. In these figures, elements corresponding to those of FIG. 6 are denoted by the same reference numerals, respectively, and thus repeated description will be properly omitted.

A rotary electric component 20 shown in FIGS. 1 and 2 comprises a cylindrical rotary knob 2, a rotary encoder of which a rotor portion 6 is rotated by the rotary knob 2, an annular thin faceplate 3 disposed around the rotary knob 2, a holder 4 (see FIG. 4) for bonding and fixing an inner circumferential portion and an outer circumferential portion of the rear surface of the faceplate 3, a light guiding member 5 (see FIG. 5) which is held by the holder 4 and of which an inner ring portion 5a and an outer ring portion 5b are connected to each other, a light source 7 disposed adjacent to the light guiding member 5, a push switch in which a pressing manipulation unit 9 is disposed inside the rotary knob 2, a circuit board 8 on which the push switch, the rotary encoder, the light source 7, and so on are mounted, and a lower case (not shown) to which the circuit board 8 is attached and which forms as one body together with the holder 4. The rotary electric component 20 is assembled in a circular cutout 11 of a front panel 10 disposed in a vehicle cabin with a display portion 3a of the faceplate 3, the rotary knob 2, and the pressing manipulation unit 9 of the push switch, etc. exposed, and the rotary knob 2 is set to protrude forward from the cutout 11.

The rotary knob 2 is provided with a protruding flange portion 2b for preventing light leakage and a positional mark 2a illuminated through the inner ring portion 5a of the light guiding member 5. The display portion 3a including symbols, etc. as indexes of the position of the rotary knob 2 is provided in the faceplate 3, and by seeing which position of the display portion 3a the positional mark 2a indicates, an occupant can confirm the position of rotary knob 2. Furthermore, since the display portion 3a is illuminated through the outer ring portion 5b of the light guiding member 5, an occupant can manipulate the rotary knob 2 without difficulty in darkness such as might be experienced during nighttime driving. Moreover, the light incident on an end surface 5c of the light guiding member 5 from the light source 7 is emitted from the inner ring portion 5a to the rotary knob 2 and is also emitted from the outer ring portion 5b to the faceplate 3.

The faceplate 3 are bonded and fixed to the front end surfaces of a small-diameter annular portion 4a and a large-diameter annular portion 4b of the holder 4. In addition, as shown in FIGS. 2 and 3, the large-diameter annular portion 4b bonding and fixing the outer circumferential portion of the faceplate 3 protrudes forward farther by a predetermined amount (for example, about 0.5 mm) than the small-diameter annular portion 4a bonding and fixing the inner circumferential portion of the faceplate 3. Furthermore, a protruding portion 12 continuously extending around the circumferential edge of the cutout 11 is formed on the rear side of the front panel 10, and the assembly position of the rotary electric component 20 into the front panel 10 is aligned such that the protruding portion 12 closely presses the outer circumferential portion of the faceplate 3. Herein, since the annular thin faceplate 3 has sufficient flexibility, it is easy to allow the protruding portion 12 to compress the outer circumferential portion of the faceplate 3 even if a slight numerical error exists.

Next, a countermeasure for preventing light leakage in the rotary electric component 20 described above will be explained. Since the protruding flange portion 2b is provided in the rotary knob 2 so as to overlap the small-diameter annular portion 4a of the holder 4, it limits the possibility that the light emitted forward from the inner ring portion 5a of the light guiding member 5 for illuminating the positional mark 2a will leak through a gap between the rotary knob 2 and the small-diameter annular portion 4a. Specifically, in the present embodiment, since a black paint, which reflects minimal light, is applied on the bottom surface of the flange portion 2b, little light is reflected from the bottom surface and then leaks.

For the light emitted forward from the outer ring portion 5b of the light guiding member 5 for illuminating the display portion 3a, the inner circumferential portion and the outer circumferential portion of the faceplate 3 are bonded and fixed to the holder 4, but the adhesive strength may deteriorate over a long period of time, thereby causing the looseness of the faceplate 3. Therefore, in the present embodiment, a construction is employed in which the large-diameter annular portion 4b of the holder 4 protrudes forward slightly farther than the small-diameter annular portion 4a and the protruding portion 12 of the front panel 10 presses a region of the outer circumferential portion of the faceplate 3. The circular region of contact between the protruding portion 12 and the faceplate 3 is at a smaller diameter than the region of the outer circumferential portion of the faceplate 3 that is supported by the large-diameter annular portion 4b. When this construction is employed, since a region of the outer circumferential portion of the faceplate 3 not supported by the holder 4 is pressed backward by the protruding portion 12, a bending moment is applied to the outer circumferential portion of the faceplate 3, so that the inner circumferential portion is reliably pressed against the small-diameter annular portion 4a of the holder 4. For this reason, even if the adhesive strength deteriorates, the inner circumferential portion of the faceplate 3 does not get loose from the holder 4. Thus, it is possible to reliably prevent light leakage due to the looseness of the faceplate 3 over a long period of time.

Furthermore, since the protruding portion 12 of the front panel 10 continuously extends around the circumferential edge of the cutout 11, it is easy to compress the inner circumferential portion of the faceplate 3 against the holder 4 around the entire circumference. Furthermore, even if the protruding portion 12 is provided in the front panel 10, it is possible to ensure a large exposure area in the cutout 11, so that a space for the display portion 3a or the rotary knob 2 is not limited.

The present invention is put into practice as described above and exhibits the following advantages.

Since the outer circumferential portion of the faceplate disposed around the rotary knob is supported by the holder at a location farther forward than the inner circumferential portion thereof, and a region of the outer circumferential portion of the faceplate not supported by the holder is pressed backward by the protruding portion of the front panel. Thus, the inner circumferential portion adhering to the holder keeps getting compressed to the holder. For this reason, even if the adhesive strength deteriorates, the inner circumferential portion of the faceplate does not get loose from the holder. Thus, it is possible to provide a rotary electric component capable of reliably preventing light leakage due to the looseness of the faceplate over a long period of time.

What is claimed is:

1. An illuminating mechanism of a rotary electric component comprising:
    a rotary knob assembled in a cutout of a front panel in an exposed state,
    a thin faceplate having a display portion disposed around the rotary knob,
    a holder for bonding and fixing an inner circumferential portion and an outer circumferential portion of the rear surface of the faceplate, and
    a light source for emitting light from the rear side of the faceplate to the display portion,
    wherein a region of the holder bonded to a first outer circumferential portion of the faceplate protrudes forward farther than a region of the holder bonded to the inner circumferential portion of the faceplate, and an area in a second outer circumferential portion of the faceplate is pressed by a protruding portion formed on a rear surface of the front panel.

2. An illuminating mechanism of a rotary electric component according to claim 1, wherein the protruding portion is continuously formed around the circumferential edge of the cutout of the front panel.

3. An illuminating mechanism of a rotary electric component according to claim 1, wherein a first annular portion of the holder is bonded to the first outer circumferential portion of the faceplate and a second annular portion of the holder is bonded to the inner circumferential portion of the faceplate.

4. An illuminating mechanism of a rotary electric component according to claim 3, wherein the circular region of contact between the protruding portion and the faceplate is at a smaller diameter than a region of the first outer circumferential portion of the faceplate that is bonded to the first annular portion of the holder.

5. An illuminating mechanism of a rotary electric component according to claim 1, wherein a first circular contact area between the protruding portion and the second outer circumferential portion faceplate is spaced closer to the knob than a second circular contact area between the holder and the first outer circumferential portion of the faceplate.

6. An illuminating mechanism of a rotary electric component according to claim 1, wherein a first circular contact area between the protruding portion and the second outer circumferential portion faceplate is spaced closer to the knob than a second circular contact area between the holder and the first outer circumferential portion of the faceplate; and
    wherein a first annular portion of the holder is bonded to the first outer circumferential portion of the faceplate and a second annular portion of the holder is bonded to the inner circumferential portion of the faceplate.

7. An illuminating mechanism of a rotary electric component comprising:
    a rotary knob assembled in a cutout of a front panel in an exposed state,
    a thin faceplate having a display portion disposed around the rotary knob,
    a holder for bonding and fixing an inner circumferential portion and an outer circumferential portion of a rear surface of the faceplate, and a light source for emitting light from a rear side of the faceplate to the display portion, wherein a region of the holder bonded to a first outer circumferential portion of the faceplate protrudes forward farther than a region of the holder bonded to the inner circumferential portion of the faceplate, and an area in a second outer circumferential portion of the faceplate is pressed by a protruding portion formed on a rear surface of the front panel;

wherein a first annular portion of the holder is bonded to the first outer circumferential portion of the faceplate and a second annular portion of the holder is bonded to the inner circumferential portion of the faceplate; and wherein the circular region of contact between the protruding portion and the faceplate is at a smaller diameter than the region of the outer circumferential portion of the faceplate that is supported by the first annular portion of the holder.

8. An illuminating mechanism of a rotary electric component comprising:

a rotary knob assembled in a cutout of a front panel in an exposed state, a thin faceplate having a display portion disposed around the rotary knob, a holder bonded to a rear surface of the faceplate at an inner circumferential portion and at an outer circumferential portion, and a light source emitting light from a rear side of the faceplate to the display portion, wherein a first outer circumferential portion of the faceplate bonded to the holder is vertically spaced relative to an inner circumferential portion of the faceplate bonded to the holder; and wherein the front surface of the faceplate is pressed at a second outer circumferential portion by a protruding portion formed on a rear surface of the front panel.

9. An illuminating mechanism of a rotary electric component according to claim 8, wherein the protruding portion is continuously formed around the circumferential edge of the cutout of the front panel.

10. An illuminating mechanism of a rotary electric component according to claim 8, wherein a first annular portion of the holder is bonded to the first outer circumferential portion of the faceplate and a second annular portion of the holder is bonded to the inner circumferential portion of the faceplate.

11. An illuminating mechanism of a rotary electric component according to claim 8, wherein a first circular contact area between the protruding portion and the second outer circumferential portion of the faceplate is spaced closer to the knob than a second circular contact area between the holder and the first outer circumferential portion of the faceplate.

12. An illuminating mechanism of a rotary electric component according to claim 8, wherein a first circular contact area between the protruding portion and the second outer circumferential portion of the faceplate is spaced closer to the knob than a second circular contact area between the holder and the first outer circumferential portion of the faceplate; and wherein a first annular portion of the holder is bonded to the first outer circumferential portion of the faceplate and a second annular portion of the holder is bonded to the inner circumferential portion of the faceplate.

* * * * *

UNITED STATES PATENT AND TRADEMARK OFFICE
CERTIFICATE OF CORRECTION

| | |
|---|---|
| PATENT NO. | : 7,059,735 B2 |
| APPLICATION NO. | : 10/758707 |
| DATED | : June 13, 2006 |
| INVENTOR(S) | : Takamichi Orikasa |

It is certified that error appears in the above-identified patent and that said Letters Patent is hereby corrected as shown below:

On the Title Page

In column 2, line 3, under "ABSTRACT", delete "portion inner" and substitute --portion. Inner-- in its place.

In column 2, line 6, under "ABSTRACT", after "assembled in" insert --a--.

In column 2, line 14, under "ABSTRACT", after "against the" delete "holder a" and substitute --holder (a-- in its place.

In the Claims

Column 6, in claim 1, line 10, after "emitting light from" delete "the" and substitute --a-- in its place.

Signed and Sealed this

Twelfth Day of December, 2006

JON W. DUDAS
*Director of the United States Patent and Trademark Office*